US011379816B2

(12) United States Patent
Mendlowitz et al.

(10) Patent No.: US 11,379,816 B2
(45) Date of Patent: Jul. 5, 2022

(54) SECURE ELECTRONIC PAYMENT SYSTEM

(71) Applicant: PAAY LLC, New York, NY (US)

(72) Inventors: Aaron Mendlowitz, Cedarhurst, NY (US); James Ruffer, III, Troy, NY (US)

(*) Notice: Subject to any disclaimer, the term of this patent is extended or adjusted under 35 U.S.C. 154(b) by 0 days.

(21) Appl. No.: 17/196,251

(22) Filed: Mar. 9, 2021

(65) Prior Publication Data

US 2021/0192487 A1 Jun. 24, 2021

Related U.S. Application Data

(60) Continuation of application No. 16/222,425, filed on Dec. 17, 2018, now Pat. No. 10,970,703, which is a division of application No. 14/255,846, filed on Apr. 17, 2014, now abandoned.

(51) Int. Cl.
*G06Q 20/24* (2012.01)
*G06Q 20/38* (2012.01)
*G06Q 20/40* (2012.01)

(52) U.S. Cl.
CPC ........... *G06Q 20/24* (2013.01); *G06Q 20/385* (2013.01); *G06Q 20/3821* (2013.01); *G06Q 20/401* (2013.01)

(58) Field of Classification Search
CPC .. G06Q 20/24; G06Q 20/3821; G06Q 20/385; G06Q 20/401
See application file for complete search history.

(56) References Cited

U.S. PATENT DOCUMENTS

2006/0235796 A1* 10/2006 Johnson ................. G06Q 20/32
705/26.1
2013/0173474 A1* 7/2013 Ranganathan ......... G06Q 20/20
705/67

* cited by examiner

*Primary Examiner* — Laura A Gudorf
(74) *Attorney, Agent, or Firm* — Schneer IP Law PLLC

(57) ABSTRACT

A novel method of allowing secure payments from a purchaser to a seller through the utilization of a combined server platform/vault server system. Such a system entails the generation of a subscription service that allows for authentication of a consumer's credit card in terms of pre-approved identification for future transactions. Such a system initiates a tokenization procedure through transfer of credit card information to the server platform through the vault program and to issuing banks/card providers. Upon acceptance thereof, the vault server generates a token that correlates to a specific credit card of a specific user that is then stored on the server platform. Upon request from a subscribing merchant for acceptance of a tokenized card for payments, the user merely needs to provide an identifying code to access the card for such a purpose.

12 Claims, 2 Drawing Sheets

SECURE ELECTRONIC PAYMENT SYSTEM

CROSS-REFERENCE TO RELATED APPLICATIONS

The present application is a continuation of U.S. utility patent application Ser. No. 16/222,425, titled "SECURE ELECTRONIC PAYMENT SYSTEM," filed Dec. 17, 2018, which is a divisional of U.S. utility patent application Ser. No. 14/255,846, titled "SECURE ELECTRONIC PAYMENT SYSTEM," filed Apr. 17, 2014. Each of the above applications is incorporated by reference herein in its entirety.

FIELD OF THE INVENTION

The present invention pertains to a novel method of allowing secure payments from a purchaser to a seller through the utilization of a combined server platform/vault server system. Such a system entails the generation of a subscription service that allows for authentication of a consumer's credit card in terms of pre-approved identification for future transactions. Such a system initiates a tokenization procedure through transfer of credit card information to the server platform through the vault program and to issuing banks/card providers. Upon acceptance thereof, the vault server generates a token that correlates to a specific credit card of a specific user that is then stored on the server platform. Upon request from a subscribing merchant for acceptance of a tokenized card for payments, the user merely needs to provide an identifying code to access the card for such a purpose. In such a manner, there is a shift in liability from credit card entity to issuing bank and greater security that the transaction is authentic. The method of achieving this result through the utilization of the described system is encompassed within the invention, as well.

BACKGROUND

The continued utilization and growth of electronic bank account transactions (such as checking, savings, debit, and credit types, for instance) has led to an undesirable increase in account invasions and thefts, leaving banks and other financial institutions with huge potential liabilities and losses. Additionally, some consumers have been susceptible to credit rating problems due to the unauthorized use of individuals' stolen bank account (for example, credit card) information. In essence, criminal activity involving concerning electronic financial account information, particularly in this age of computerized systems for such transactions, is substantial and causes enormous problems around the globe, tallying well into the billions in terms of annual cash losses. Of particular concern are situations that do not allow for financial institutions to guarantee remedies to account holders (such as for on-line checking account deductions; banks are typically not liable for any electronic thefts due to outside invasions of account information), since the innocent and unsuspecting account holder may be out a significant amount of money.

Certainly, such accounts are highly convenient and widely used; from the ease of transfer at gasoline pumps to swiping cards at retail establishments, even utilizing such payment systems to transact business over the Internet, debit/credit cards, e-checks, and other like accounts are utilized everyday by millions (if not billions) of people worldwide. In the computer realm, however, the information embedded within such accounts (and in particular cards) is a constant lure for unsavory actors. From the potential for accessing an individual's credit card identifications (such as account numbers, expiration dates, even extra access codes) through hacking operations, to planting insurgent devices to read magnetic strip records, to utilizing surreptitious cameras, and the like, to uncover an individual's inputted password or pass code information, there is a constant barrage from criminal enterprises to steal such information in as widespread fashion as possible. Even within certain settings, such as, for instance, restaurants, and the like, the trust a patron places on a server or like individual with his or her debit/credit card has, on occasion, led to theft of such information through unauthorized copying and use. Once such information is in a criminal's possession, such thieves can purchase thousands of dollars of merchandise within mere minutes, and the unsuspecting consumer eventually pays one way or another. Whether through account payments or price increases absorbed by multiple consumers in the long run, the financial institution and/or the retailer seeks recompense for such stolen moneys as well, particularly since such theft costs are typically charged back to the retailer (about 80%, generally, at least). In any event, such criminal actions will undoubtedly continue unabated as debit, credit, checking, savings, retirement, investment, etc., account information modifications have been slow to enter the financial industry, leaving such accounts susceptible to mere copying by sight or through digital signal interception, as some examples. Thus, it is evident that there continues to be a rather significant need to provide some means to avert the unauthorized use of such stolen bank account information, whether if procured in front of the account holder or through other illegal, surreptitious means. The ability to do so through a non-invasive method that provides a high degree of reliability for both the account holder and account backer would be highly prized, certainly.

There have been many attempts to prevent the illegal or fraudulent use of credit cards and/or debit cards in shopping malls, over the Internet, and at Automated Teller Machines (ATMs). These efforts include Personal Identification Numbers (PINs), the use of mother's maiden names (or other specific information) as a secret identification, and requiring credit/debit card holders to use additional ID cards such as a driver license. All attempts to use static information such as these are not completely secure, since such information can be easily learned or stolen and passed on to other users. Once the static identification number is learned, it may be used to make fraudulent debit/credit card purchases until the fraud is detected and the debit/credit card account is closed.

In addition to the PIN system mentioned above, the CVV (card verification and validation) number is an additional security system currently in place for purchases using a debit and/or credit card where the card is not physically present, such as for internet or telephone transactions. The CVV number may be alternatively called CVV2 or CID (card identification) or CCV (credit card verification or validation) by various debit/credit card companies. The CVV number is typically printed on the back of the subject card, as with MasterCard or VISA, but may be on the front of the card, as with American Express, as examples. This number typically includes three or four digits. Merchants are not allowed to store CVV numbers in their database with the account number, as a security measure, meaning that, in principle, at least, such numbers will not be disseminated if a merchant's database is compromised. Also, since the CVV number is not in the database, each transaction must be accompanied by a new request for the number from the cardholder. Nevertheless, since the CVV numbers are disclosed to the merchants, their employees, and anyone in the communications chain, they may easily be recorded and passed on in a fraudulent manner. Not to mention, in certain establishments, such as restaurants, the permissive grant, temporarily, of one's debit and/or credit card to a server or like employee for the purpose of payment at a specific financial transfer device location allows ample opportunity for a person to review and record all such necessary information to then utilize the card at a future date and time.

Alternatively, there are other nefarious operations that attempt to prod such account information from unsuspecting individuals. For example, phishing has become a standard manner of having unsophisticated persons actually provide their bank account information to unidentified on-line actors posing as a trustworthy institution or entity. In such an exercise, for example, an unexpected email or other communication may be sent to an individual indicating a problem or issue has arisen with his or her account. In order to remedy such a situation, the phishing site (a link, for instance, within an email) that appears affiliated with the individual's bank or like entity, will request verification of identity through the input of information such as the individual's name, account number, other protected information (such as a password, social security number, etc.), even addresses, as examples. Once such information is unwittingly shared, the bad actor can then access the individual's account(s) and electronically steal as many assets as desired, particularly since such an actor now has all the necessary verification information of the account holder him- or herself.

Additionally, there are currently devices of relatively low cost that may be employed surreptitiously by a bad actor to read and/or swipe embedded information from a person's card or cards via the magnetic strips, chips, or other like card information storage devices present thereon. Such reader devices may be placed in card readers that are typically accessed by consumers for payment purposes, or even within ATMs. Furthermore, however, and far more sinister, are devices that may be utilized in such a secretive fashion as to "bump" against a person's pocket or handbag (or the like) and automatically read such embedded card information. The information is thus instantly transferred to the device from which the bad actor(s) may make a copy (or copies) thereof in a new card, allowing for implementation within the new card's own magnetic strip (or like storage device). In such a fashion, the bad actor(s) can access the account through such stolen information and without the need for any further verification (since the user in that instance, being the bad actor, has the card information in hand and the standard purchasing/transferring protocols followed today require nothing further for most retail establishments, at least, to accept such a presentation).

Even more interesting is the potential for a funds transfer system to be supplied within a person's on-line account (such as Google, Pay Pal, etc.) or permitted through access from a person's phone alone (such as Google Wallet, Google Money, and the like), which actually store and utilize the person's own underlying financial accounts (whether checking, savings, credit, debit, retirement, etc., in nature). If such an on-line account is hacked or the phone is stolen, the bad actor may easily access all the underlying financial accounts linked thereto to withdraw and/or use such funds, or even just utilize the on-line system itself to make purchases, transfers, etc., on demand. Password technology is currently used to protect such possible problems, but, as noted above, sophisticated bad actors can detect and/or discover such information (even through answering certain general questions, the answers to which may be easily understood or at least uncovered). As such, mere hacking or physical theft could lead to such financial account invasions. If the phone or on-line account user leaves an email or other account open on his or her computer or phone, then the bad actor's accomplishments in this manner are made that much easier. Furthermore, such a bad actor could also set up new accounts in this type of theft situation, particularly if certain background information (social security number, etc., for example) has also been absconded with, thereby allowing for further fraudulent activity in this manner, all through a hard-to-detect new unauthorized account.

Some banks and other card providers have a monitoring system in place to at least attempt to prevent suspicious activity. For instance, the utilization of a card in a foreign location, for a rather large purchase, or other like potentially unlikely situation, may trigger a financial institution to call or otherwise try to communicate directly with the card holder for verification purposes. If such a communication fails to reach the card holder, the transaction may be held pending a reliable response. However, if the number involved, for example, is picked up by the bad actor in such an instance (such as through a stolen phone or even if the person is at the card holder's own home), then the financial institution, despite attempts to prevent such a problematic occurrence, may be forced to pay for such a mistaken identity (regardless of the malfeasance involved). Even more troublesome is that such suspicious activities have been uncovered through the utilization of certain algorithms by the subject financial institution searching for anomalies in account use. Unfortunately, though, some criminals have developed (or have had developed) similar programs to emulate these anomaly-searching types of financial institutions' in order to predict such situations and thus to provide initial warnings of probable unacceptable account activity in relation to the financial institution operations. In this manner, these bad actors are provided with a means to avoid such questionable account transactions (whether geographic location, threshold amount, type of merchant, etc.) and undertake those that will more likely be accepted, thereby skirting the supposed failsafe measures currently in place. Additionally, a typical operation known as "cramming" involves the accumulation of small charges ($10-50, for instance) sporadically over a significant time period so as to increase the chances that such actions go unnoticed by both the account holder and the financial institution, particularly if monitoring by either party is limited. In essence, in each situation, the criminal element has realized a means to evade the security measures implemented by the financial institutions; there are thus great needs, again, to overcome these potential pitfalls.

Of particular importance is the typical scenario wherein the financial institution (bank or creditor, for example) detects suspicious activity and tries to contact the account holder. If such a communication fails (at least at that moment, such as if the account holder is asleep or otherwise indisposed), then much of the time the actual transaction is actually processed (depending, for instance, on the amount of money involved; the lower the amount, the more likely the transaction will proceed to any inconvenience at that time for either the presenter or the retailer). Otherwise, the potential for an interruption during the communication attempt may prove problematic to the degree that any account suspension due to such glitches may be too great a problem for the bank/creditor to want to cause such possible distress and/or other inconvenience to the account holder customer. As such, it is currently a common exercise to avoid such temporary suspensions unless proper communication is achieved or, alternatively, if the transaction is below a certain amount threshold, as noted above.

Furthermore, other systems have been developed that try to implement verification processes (passwords, etc., for example) to permit further financial account activity. However, even the most advanced versions of these systems utilize a single certification point and require the use of an easily (in most instances, at least) stolen password to verify identity. Even if verifications are attempted, particularly if there is questionable activity involved, certain communication platforms may still be insufficient to thwart unwanted and potentially criminal activity. For instance, the simplest of communication operations, such as SMS notifications, may still not get to the actual user until after a suspicious credit card transaction occurs. The lack of any other verification techniques for such a purpose leaves the financial institution, and the user, for that matter, at the mercy of almost happenstance; if the user is, again, not by or near his or her phone, or not at another registered phone or other communication device (even if the communication is made by email, text, etc.), then the entire transaction will fail. If it is an actual desired transaction (if it is true in that sense), it could be prevented rather than permitted, leaving the actual, verifiable user unable to complete a transaction. In other words, the systems currently in place are noticeably deficient in that they either provide too stringent a system of protection (leaving, again, the account holder/user at the mercy of having a communication device that is, for instance, fully powered, at the point of purchase, for verification purposes) or a system that could permit a bad actor too easy a manner of avoiding the preventive measures sought through such a base security procedure. In those instances, it could be, for instance, greater than 24 hours before such a fraud is noticed, leaving, again, all the entities involved at the mercy of a fraud already committed by someone (or many persons) (or some entity), leaving an innocent party (or parties) forced to pay for such an illegal transaction.

There have also been proposed (and, in certain locations, implemented) more exotic and technical systems and methods for validating credit card holder identities. However, these systems likewise exhibit significant drawbacks. Some are too complex and require new card types to be issued and/or new merchant hardware for their use, and others are too easily learned and passed on to other users. Others have been avoided by the financial industry due to the necessity of changing such card articles at too great an expense (such as, for instance, including microchips, RF sensors, and the like, within the card bodies). Other activities have included the attempt to couple photos of the user in an on-line environment, at least, to a system present within a retailer's establishment. In all such scenarios, the difficulties in implementation were greater than the industry was willing to withstand, ranging from costs to privacy concerns for the card users themselves.

Basically, it is clear that even within the most advanced system a continuous link is needed in order to verify identity through a mobile device. A password is required and any break in signal causes a transaction to be declined. Such identity verification systems all lack the capability of multiple certification points. They also lack the ability to accept different types of simultaneous verification points such as the requirement of SMS and email verification for a specified transaction, not to mention the ability to leave a transaction as pending while awaiting secondary verification. Overcoming such deficiencies would thus be a benefit for corporate customers and for on-line shopping, at least. In essence, although many resourceful measures for preventing bank account fraud have been published in existing patent literature, none have offered a system in which security may be enhanced with a suitable middleware program/device that allows for instant communication between merchant and credit card entity for authentication purposes and without the need for the actual card itself. In such a manner, at least, the card holder could avoid actual contemporaneous possession and transfer of such a card during a shopping/purchasing activity (as well as the ability to not actually keep the card on themselves that may lead to theft, either directly or surreptitiously of the card information itself). Such a situation would, if authenticity were permitted without the card in hand, an effective means to avoid actual plastic (or other type) card use altogether, while still allowing for proper transfer of funds from issuing bank to merchant as desired by the actual purchaser.

As such, as outlined above, despite the large number of attempts for such reliable theft and/or fraud prevention procedures, there remains a distinct need for such a desirable system for ensuring account use is by the proper account holder, thus allowing for the detection of stolen or other type of fraudulent bank account information use at the moment of actual activation. To date, as noted above, the possible options have been deficient or too complicated to establish as a suitable means for this purpose, particularly on a large-scale, widespread basis. A development that permits ease in not only implementation but utilization, coupled with complete (if not substantial) reliability that any such account transaction is authorized, would be highly prized within the industry from the financial as well as the consumer standpoint.

SUMMARY

The present invention provides a distinct advantage by allowing for purchasing transactions with a credit account without the need for a physical card. Another advantage is the ability to permit such a "card not present" transaction without any need transfer credit card information to a merchant, thereby reducing, if not removing, liability to such an entity. As such, yet another advantage of such a system is the ability to lower interchange rates for credit transfers due to the authenticity and liability transfer considerations involved, thus lowering such rates for merchants and, ultimately, consumers. Additionally, the inventive system provides the overall advantage of quick transaction capability with substantial reliability and authenticity due to the need of only a single piece of information from the purchaser and the capability of nearly instantaneous communication from the merchant to an authentication notification program. Thus, yet another advantage is the ability to provide a simple account set-up protocol including the creation of the necessary informational aspects of the authentication process that can be stored within a separate vault server with tokenization of a credit card thereby for storage on an authentication notification server to enable actual implementation and utilization of a transaction between a user and a merchant without any need for card presentation.

Accordingly, this invention encompasses a computerized payment verification system for the authentication of a consumer's identity in relation to said consumer's credit card account, said system comprising an authentication notification server, a token generation and information storage server, and an electronic and wireless subscription service, wherein said subscription service creates a communication and information transfer connection between said consumer and said authentication notification server and permits uploading of said consumer's credit card account information for authentication during initial system setup for the correlation to a generated token that represents said consumer's authenticated credit card account; wherein said authentication notification server allows for receipt of said consumer's credit card information and transference thereof to said token generation and information storage server; wherein said token generation and information storage server includes means to communicate with a merchant plugin ("MPI") to authenticate the correlation between said consumer and said credit card account information; wherein said token generation and information storage server further includes means to generate a token correlated to said resultant authenticated credit card account information correlated to said consumer; wherein said authentication notification server stores said resultant token; and wherein only said token generation and information storage server retains any credit card account information of said consumer. Such a subscription service is preferably an app that may be utilized within a mobile communication device by the consumer and that is also utilized for subscriptions by merchants for acceptance of such a payment verification system.

Thus, in actual practice, this invention further includes a method for undertaking a purchase transaction between a consumer and a merchant, wherein both consumer and merchant are subscribed to a system as described above, wherein said transaction includes a payment activity through funds transfer from said consumer's credit card account, wherein said credit card account is issued by a bank and handled through a credit card entity, and wherein said funds transfer is processed by an independent service organization ("ISO"), said method comprising: the presentment of a piece of identifying information to said merchant by said consumer as a proper indicator to send a request for authentication to said authentication notification server to permit funds transfer to said merchant from said consumer's credit card account; correlation of said identifying information to said established token related to said consumer's credit card account by said authentication notification server; transfer of said correlated token to said token generation and information storage server to generate a request for utilization of said credit card account from the proper ISO for such an account; transfer from said proper ISO to consumer's issuing bank and/or card provider to establish approval or denial of utilization of said consumer's credit card account for such a payment transaction; transfer to said proper ISO of approval or denial from said issuing bank and/or card provider; transfer of such a result to said authentication notification server from said proper ISO; and transfer of such a result from said authentication notification server to said merchant; whereupon if approval has been granted and transferred to said merchant, then the requested funds are transferred to said merchant from said consumer's credit card account; wherein such a method is undertaken without any need for said consumer to present or otherwise provide information pertaining to said credit card account to said merchant; and wherein said method is undertaken through the utilization of at least one computer program within a non-transitory medium.

The value in the utilization of credit cards reside solely within the actual credit card account itself. The ability to access such a credit account is facilitated through the utilization of a card having unique identifying numbers related to the account holder (whether a person or other entity). Credit card entities, such as Visa, Master Card, and the like, have traditionally provided such card account numbers in relation to a specific issuing bank account. The issuing bank thus decides if the person (or other entity) is worthy of certain credit limits and agrees to provide such credit in that manner. Thus, the issuing bank contracts with the credit card entity to permit utilization of an identification account for a person (or other entity), creating an easier way to access such credit funds for various purchasing locations (whether in-person or on-line, for example). In these situations, although the issuing bank agrees to fund the credit accounts (expecting repayment, of course), the credit card entity takes on much of the liability if any purchases are deemed fraudulent under a specific account number. Thus, much trust is placed by the issuing bank on the credit card entity, which, in turn, is passed on to the actual merchant involved in the actual transaction. With this increased liability level, the credit card entity requires a certain amount of payment for each such transaction as a way to generate both revenue as well as funds in case a fraudulent transaction occurs. Such credit card entities, at this time, are basically contracted to cover not only the liability for the issuing banks, but also for the purchaser (if, for example, an fraudulent charge is made to such an account, the credit card entity agrees to waive such a charge and thus repayment from the purchaser) and, to a certain extent, the merchant. Thus, much is placed on the credit card entity at this time to best ensure, if possible, that all such transactions are proper and trustworthy. These percentage costs, attributable to the actual proceeds received by the merchant, are typically passed on to consumer, leading to higher prices overall. Additionally, the potential for widespread fraudulent acts through stolen cards, identities, etc., can and, in some circumstances, have proven very taxing on the economy, and certainly to different levels of the manufacturing/selling hierarchy.

The present invention creates a system that allows for such liability to be transferred from the credit card entity to the issuing bank, with sufficient reliability at that level that interchange costs (percentage sales) can be effectively reduced and leveled. As well, the ability to steal account information or otherwise utilize a certain card account is reduced as the claimed inventive system allows for only the presentment of a piece of information for validation purposes, rather than a card that houses valuable information.

Credit card transactions fall into two basic categories: presentment in person and presentment when not present. In other words, purchases (and thus payments by a purchaser) can be made utilizing such card accounts at the actual location (e.g., at a merchant), including, for instance, retail stores, restaurants, pay machines, and the like. Otherwise, the purchaser may pay through transferring card account information over the phone, through a set on-line purchasing system, or even just through inputting account information through an e-commerce portal. The present invention takes into consideration these differences and, as well, the costs borne by merchants and consumers in relation to such diverse processes (as alluded to above). For instance, even though card holder identity may be suspect in some circumstances when undertaken through presentment in person, the degree of reliability due to the potential for the merchant to take some actions for verification (checking IDs, for instance) gives the issuing bank and credit card entity (such as Visa, Master Card, Discover, Diner's Club, and American Express, as examples) increased trust in the authenticity of the actual transaction (e.g., that the actual purchaser is the same as the card holder). When presentment of card account information is made in absentia (e.g., not in person, such as with an on-line transaction, or when supplied through an on-line fund account), the chances of fraud (and thus the potential for losses by the credit card entity) are increased, thus leading to higher interchange rates as offsets for such potential problems. The ability to lower, if not eradicate, the potential for fraud in either situation, and thus to lower the levels of interchange rates across the board, exists with this present invention.

As another consideration, however, unfortunately, as discussed above, the actual presentment in person of a card may lead to other undesirable consequences, such as a bad actor reviewing, photographing, recording, etc., the surface-provided card information (account numbers, CVV numbers, expiration dates, etc.), or, alternatively, the potential for a bad actor to illegally swipe the information embedded within a code strip and create a new card, particularly if the numbers are recorded to such an extent. Thus, the ability to provide a system that removes the need for actual card presentment (or otherwise presentment of identification/ account numbers from such a card, such as typical on-line purchasing requirements) would be highly prized. The above-defined system provides all of these benefits.

The overall method/system importantly provides a multi-server component that allows for reliable communication and transference of information, without the need to share any credit account information within the merchant's own systems. As defined above, these servers are the authentication notification server (also referred to below as the "platform server") and the token generation and information storage server (also referred to below as the "vault server"). The platform server acts primarily as a conduit between the subscription app system and the consumer, the merchant, and the token generation and information storage server (the vault server). The vault server thus receives credit card information and consumer identification information and communicates with processors (ISOs), issuing banks, and card providers (directly or indirectly) to provide the initial authentication of all such correlated information. Once acceptance or denial of such an authentication request is received by the vault server, a token is generated (if accepted) or indication is sent to the platform server for notification of denial to the consumer. If the token is generated, notification is provided by the platform server to the consumer that the app program can now be utilized as a mobile "wallet" in relation to each tokenized (and thus properly authenticated) credit card present therein. In this manner, as well, a subscription merchant has no need to have the consumer present his or her credit card (or any other credit card information, if, as noted above, in a "card not present" situation) to enable a funds transfer within a purchase transaction. The consumer only needs provide an identifying piece of information within the app that automatically triggers the correlation between such information and a token within the platform server. If such a correlation exists, then the vault server is notified to request information from the ISO and thus the issuing bank and/or card provider for funds availability to fulfill the purchase transaction request. If such is met, the platform server is notified by the ISO to proceed with such a funds transfer and the transaction is completed. In this manner, there is created an overall system that provides reliable funds transfer capability from a consumer's credit card account to a merchant without any need for the merchant to receive nor, naturally, retain, any consumer credit card account information to any degree.

This situation is extremely important from a liability standpoint as the potential for hacking of stored merchant information systems may lead to (and has in fact led to) the unwitting release of valuable consumer credit account information. As such, the platform server (coupled with the vault server) acts as a conduit of information that prevents any further account information transfer to a merchant. The merchant would thus subscribe to the overall system allowing for the platform and vault servers to control information transfer in this manner. As such, the issuing bank and/or credit card provider also works in tandem with these servers to accept specific information regarding specific credit account holder's accounts (and requests for funds release for purchasing activities) by receiving a request coupled with the necessary piece of information for identity validation. Upon such validation (verification) of consumer in relation to consumer's credit card account by the issuing bank and/or card provider, the vault server generates a token (or responsive piece of information) that acts to show validation (verification) of such a request. The vault server then transfers the resulting token (or denial, if necessary) to the platform server in order to then either store the token for future activation by the consumer within the app program or notify the consumer of the denial of such an electronic wallet request.

Importantly, the responsive token will not include any information regarding the credit account holder or the credit account itself. As alluded to previously, this aspect is of enormous importance as there is thus no need to transfer any account information to the merchant that requires storage within its own database(s), which, itself, may accumulate to a rather large amount, requiring an enormous amount of potentially expensive memory that could be better utilized for other purposes, or that would allow for funds to expended for other items, or the reduction of any expenses in this manner to alleviate such cost requirements along the entire purchasing/sales chain). Additionally, of course, this also allows for the removal of one rather large, enticing pool of valuable credit account information from hackers or bad actors. As such, the ability to send a piece of information to the credit card entity/issuing bank for verification and receiving a simple responsive token indicating acceptance, while shifting liability to the issuing bank, all through a middleware system, is highly unique and removes the need for presentment or divulging of credit card account information (whether in terms of numbers of card swiping actions) ever again.

In terms of the "piece of information" needed for this system to operate properly, such may be of any type of comprehensible numbers or letters (or other symbols, for that matter) that can be transferred from the credit account holder to the middleware component and then fully understood for transfer to the issuing bank. Thus, standard numerical PINs may be utilized, alphanumeric sequences, typographical symbols mixed with numbers and/or letters, the list goes on. The important issue is that the information is created at the time the account is initiated in order for the issuing bank and the credit account holder to have the same unique piece of information as validation of the credit holder's identity. The account holder may then either utilize this at a subscribing merchant or download an app on his or her smartphone (as one example) to permit utilization at a subscribing merchant (in essence, the credit account holder may also "subscribe" to the overall system through the app itself or utilize the system "on the fly" at a participating merchant). Once a purchase is decided upon, the credit account holder may then simply indicate to the merchant, through a link via the app or in person, the specific identifying information in relation to the subscription system. At that point, the request is sent to the platform server that then transfers the request and piece of information to the vault server. The vault server then requests the processor (ISO) to verify funds availability of the specific tokenized credit card account through communication with the proper issuing bank and/or card provider. Once validated, the ISO notifies the platform server if approved or denied and the platform server then notifies the merchant and/or the consumer that either the transaction will commence or not. Such a system allows the purchaser (consumer) to make the request and ultimately checkout very quickly, within at most 30 seconds, all with a reliable result for all the parties involved, and all without any need to present a credit card (or other type of credit card account information) to a merchant. Such a system thus works, as alluded to above, for actual in-person purchases at a retail establishment or through an on-line or even telephonic purchase situation. Importantly, the term "merchant" is not intended to limit such an entity to any type of establishment, retail or otherwise. Thus, for example, such a system may be utilized for the purchase or payment of services, including medical treatments, etc., transportation services (such as the purchase of tickets through a kiosk-type device, as one non-limiting example), and other instances wherein a credit card may be utilized for payment purposes. The only necessity is the involvement of the "merchant" in such situations within the subscription service for implementation and utilization of the platform and vault servers for such a purpose.

In either situation, the entry of information must be from a specific source, such as the purchaser's own smartphone that is registered with the account at the time of account set-up as well. This may be coupled with the utilization of a specific piece of information that can be entered within the transfer source (again, a smartphone, as one example) and sent to the platform server (and then to the vault server). In this manner, even if the piece of information has been absconded with, any thief of such information must still have access to the specific transfer source as well for a valid funds transfer to occur. Even if both are stolen, however, the ability of the credit account holder to notify all parties (particularly, of course, the credit card entity and the issuing bank) of such a situation can lead to immediate shutdown of the specific credit account under those circumstances. Furthermore, the credit account holder can further institute impediments to utilization of such a transfer source through an initial password screen or screens, or other possible obstacles (for instance, dialing of the phone number and deactivating the app or other portion of the phone from a distance). In any event, the liability in such a situation will either reside with the credit account holder (for loss of the transfer source and dissemination of the piece of information) or with the issuing bank (or vault server holder); not merchant, in such a situation. Thus, there is no need for a physical credit card to provide payment, either in person or on-line, with utilization of this inventive method.

The inventive system functions properly when a plurality of merchants have subscribed to be included within the app program including the platform and vault servers described herein. Through the involvement of dedicated merchant participants, the system allows for the middleware server(s) to directly and safely transfer the necessary information to issuing banks from the merchant and then receive and send notifications to ISOs (and the merchant, ultimately, if needed) that acceptance and validation of the credit account at issue has occurred. This subscription system permits effective control of such information and shifts the liability issues to the system (as well as the issuing bank) from the merchant and the credit card entity. Such a subscription thus entails agreement and direct link from the merchant to the middleware server(s) for this purpose. If a merchant has not subscribed, the purchaser will not be able to simply provide his or her piece of information (again, PIN, etc.) from their transfer source (again, smartphone, etc.) to initiate validations for funds transfers.

For this inventive method, the term "credit card account" or "account" is intended to pertain to any account in place and set up by an individual or corporate entity (including partnerships, limited liability companies, corporations, and the like, without limitation) and a issuing bank (or other type of financial institution, such as, for example, a credit union) to allow for holding of credit funds on the individual or corporate entity's behalf, and permitting transfer thereof such funds from the account to a merchant.

The term "computer program" or other like description is intended to denote that the overall method is controlled by software code and through the utilization of a computer machine (or the like) for implementation and utilization. The present invention may be implemented on a program or code that can be stored in a computer-readable (or electronically-readable) medium and that can be provided in a WAN environment. The overall system may be implemented onto a server using, as non-limiting examples, Apache web server, MySql on Linux, Oracle on Linux, Java servlets, Applets, HTML, JavaScript, Java, C#, and Microsoft's .NET, in such a manner as an account holder or account provider would have access thereto on demand through a secure connection. Such a server may reflect implementation on the Internet, an intranet, or an extranet. Any software platform may thus be employed to implement the underlying algorithm system, such as JAVA, Linux, and the like, and the code itself may be written in any language, including, BASIC, COBOL, C+, C++, and the like.

Importantly, such a system may be utilized for any type of electronic funds transfer. As such, although the term "credit card" is cited primarily throughout, such a term, particularly when linked to an account of some type that allows for transfer of funds, is intended to encompass any type of account that permits such a result. Thus, a bank account, debit card, gift card, or any other account that requires some type of clearing house handling, generally speaking, for authorization of funds transfer, may be utilized within the scope of this invention (and all such accounts would thereby fall under the category of "funds transfer account"). Likewise, such an account, as broadly provided, may be properly tokenized in the same manner and linked to the dual-server protocol described herein for secure funds transfer capabilities.

Such a platform and vault server system protocol is unique and provides an unexpectedly effective means of accomplishing this reliable, low-bandwidth, funds transfer operation, all while limiting the amount of information shared for such a purpose to a simple piece of identifying information (a PIN, again, for example) from a specific transfer source (a smartphone, again, for example) with the receipt of a responsive token and generation of a simple funds transfer request to an ISO. Such an elegant system is, again, nonexistent within the credit card industry as of today.

DETAILED DESCRIPTION

Without any intention of limiting the breadth and scope of the overall inventive method, the following descriptions of the accompanying drawings provide one potentially preferred embodiment of the utilization of the aforementioned inventive algorithm as implemented within a credit card fraud elimination process.

Figure 1:
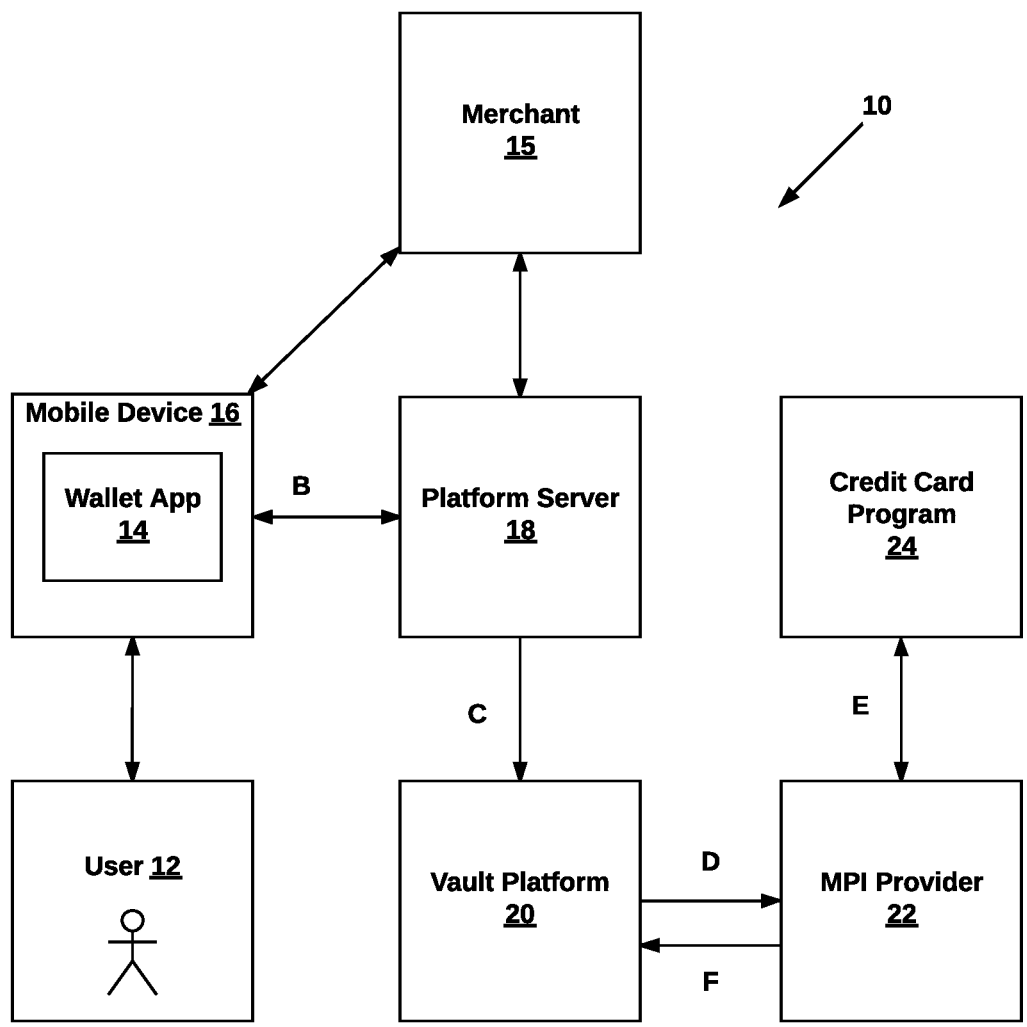
FIG. 1 is a schematic outlining a potentially preferred procedure for registering and tokenizing a user's credit card prior to actual processing for payments.
Figure 2:
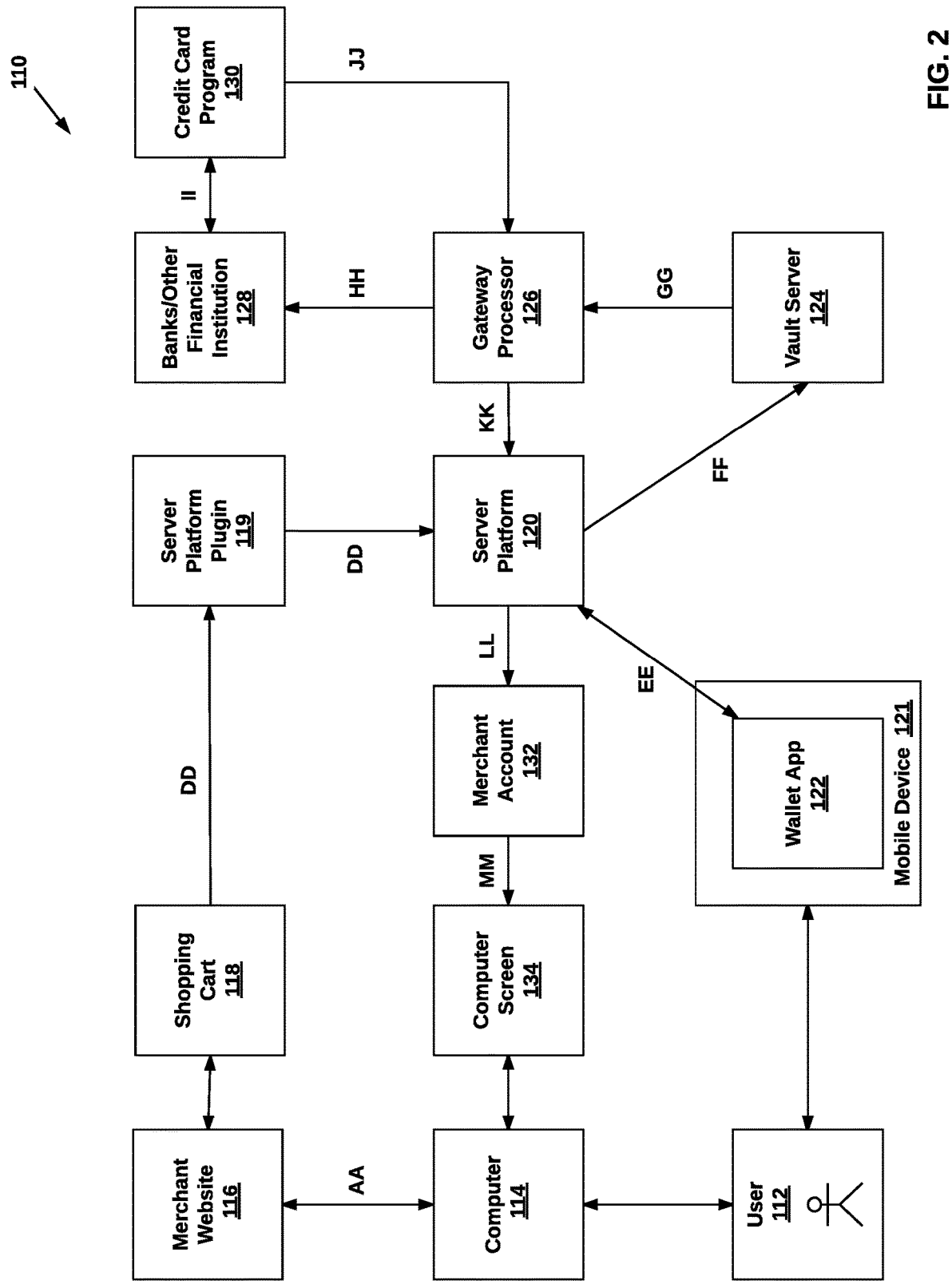
FIG. 2 is a further schematic of one possible embodiment of a potentially preferred credit card validation processing system utilizing a properly tokenized credit card.

FIG. 1 herein shows one potential manner of initially setting up a user's credit card for future utilization within the payment system. In this procedure 10, a user (consumer) 12 first downloads an app to his or her mobile communication device 16 allowing for direct communication with a platform server 18. Such communication involves a setup process (B) wherein the user 12 adds his or her credit card (or cards) within the app for transfer to the server 18. Such a step (B) thus includes the input by the user 12 of his or her credit card number and any number of other identifying features (such as a CCV, expiration date, user billing address, etc.), as needed. The platform server 18 then communicates with a vault/tokenizing server 20, thereby sending the unique credit card information transferred/submitted by the user 12 to the vault 20 for the generation of a unique token (step C) in relation to each specific and properly identified credit card. The vault 20 then correlates such credit card data to the actual MPI provider 22 (i.e., the issuing bank or other like financial institution) associated therewith and "pings" the provider 22 for verification of enrollment and proper status (step D). The provider 22 then submits the "pinged" information to the card program 24 (such as VISA, MASTERCARD, DISCOVER, and the like), for further verification (step E involves this request/reply process). Upon receipt at the provider 22 of such a verification, the provider 22 then replies to the vault server 20 (step F) indicating either acceptance or denial of the overall authentication inquiry (D). If denied, then the vault 20 communicates to the platform server 18 of such an outcome and the user 12 is also notified. If accepted, the vault 20 then stores the token for all future activities sought by the user 12 in relation to payments with the tokenized card. Thus, such a card (or cards) for the user 12 is (are) ready for processing within the overarching payment process (FIG. 2). The vault server 20 thus stores the token for each enrolled and verified credit card in this manner for each subscribed user 12. Thus, in this manner, the user 12 can have any or all of his or her credit cards electronically tokenized within a personal "wallet" uploaded to and accessible from his or her mobile communication device 16.

If the user 12 then makes a purchase at a retail site for which subscription to the overall system (as shown in FIG. 2, at least), then all that is needed is presentment of an identifier for the specific card from within his or her personal "wallet" (from the app 14), rather than the card itself, to the retailer (or other subscribed merchant 15). Upon submission to the platform server 18 by the merchant, the identifier correlates the user 12 to the card via the token stored within the vault 20 that has already been verified for such a payment activity. The user 12 may thus simply provide a further identifier (such as a passcode) through the app 14 that is accepted by the server platform 18 to allow the transaction to be completed.

FIG. 2 provides a more in-depth presentation in schematic form of an overall payment system 110 utilizing the tokenized credit card shown in FIG. 1. The schematic thus shows various components within the potentially preferred inventive method to accomplish the desired reliable credit card funds transfer result through a safe and secure system. As shown, the overall system 110 include a "card not present" purchasing alternative. In this manner, a subscribed merchant permits such an electronic app wallet 122 by a user 112. Thus, for example, a user 112 may access a computer 114 to seek a possible purchase through a merchant's website 116 (step AA). The website 116 may include an on-line shopping cart 118, thus allowing the user 112 to place selected items therein and then checkout utilizing the subscribed-to server platform 120 (DD). In this manner, the server platform plugin 119 (subscribed-to service, in other words) "pushes" the selected items from the shopping cart 118 to the server platform 120 (again, step DD). The server platform 120 then accesses the user's app program (mobile wallet) 122 for authentication for payment activity (EE). In other words, the server platform 120 seeks approval or denial of the payment action by the user 112 within the card not present situation. To accomplish this, the app program (user's mobile wallet) 122 communicates back to the server platform 120 which then sends information to the vault server 124 as to the specific credit card from the mobile wallet to be utilized for such a transaction (FF) (with such a card indicated by the token generated upon setup, as in FIG. 1). Once the specific token is provided in such a fashion, the vault server 124 communicates the request for payment to the related gateway processor 126 (e.g., the processor associated with the specific card at issue) (GG). The processor 126 then sends along the request for approval (or denial) as to available funds to the bank or other financial institution 128 (HH) which then sends along the same query to the card provider 130 (II). The reply then goes back through the bank 128 (reply portion of II) as well as directly back to the processor 126 (JJ). The processor 126 then relays the approval or denial response to the server platform 120 (KK) which then informs the merchant (or, more appropriately, perhaps, the acquiring bank) 132 (LL) of such a card status and the user 112 is then informed on the computer screen 134 by the merchant 132 (MM). Thus, if approved, the funds are transferred from the issuing bank 128 to the acquiring bank/merchant 132 without any need for presentment of the actual credit card let alone any presentment of specific card information. In this manner, the merchant has no need to accept or, for that matter, store any credit card information from its patrons as the overall system 110 allows for proper verification of identity and funds availability nearly instantaneously through the utilization of the subscription service.

In either card present or card not present situation, the purchaser has a transfer source (here, a smartphone 16, 121, such as, without limitation, an iPhone, iOS, Android, and the like) that includes the app 14, 122 set-up properly with and in relation to a credit account with the credit card entity/issuing bank and tokenized through the server platform and the vault platform. Once an amount is requested for payment by a subscribing merchant, the purchaser activates the payment system on the transfer source and inputs a specific piece of information therein for communication to the server. The server platform itself is equipped to receive such information and relay to the vault server for storage thereon. The vault server thus creates a token for each credit card that is then transferred to the server platform for future utilization within the subscription system. To ensure the tokenized card(s) is properly accorded verification, the vault server, during initial setup requests authentication by the specific credit card entity/issuing bank (and then, through that entity, to the card provider, such as VISA, MASTER CARD, DISCOVER, and the like) of the user (consumer) in relation to the specific card. The actual credit card information will thus be solely kept for each tokenized card within the vault server memory as a means to possibly authenticate should a discrepancy occur during actual utilization by a user (consumer). Such a vault server may be configured for such operations through Apache/Nginx or CakePHP protocols, as non-limiting examples, with the appropriate source code in place and well within the understanding of the ordinarily skilled artisan to accomplish these necessary operations. The information relays to the credit card entity/issuing bank(s), card provider(s), etc., are permitted through, as one non-limiting example, a secure MySQL link, as well. If the credit card entity/issuing bank and/or card provider accepts the authentication request by the vault platform, then the token is also accepted and related directly to the credit card information kept within the vault server. The token is then generated and sent to the server platform for, as noted above, further utilization by the consumer (user), as needed.

With this system, nearly instantaneous communication of validating information through a central middleware server allows for proper filtering and greater reliability of results in terms of purchaser identifications. The issuing bank can then feel secure that the proper identification protocols are in place to ensure, at that moment, that the proper person (or other entity) is receiving the funds for transfer to a merchant, thereby reducing the liability on the other transaction parties for any potentially fraudulent activities. Additionally, through this method, there is no need for a person (or any other entity) to use or need to present an actual credit card or even any other identification means for such a credit card transaction to occur in such a reliable fashion.

Thus, the preceding explanations, descriptions, and figure examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

What is claimed is:

1. A method for undertaking a purchase transaction between a customer and a merchant comprising:
    receiving, by an authentication notification server, from a merchant, a request to permit transfer of funds from a funds transfer account associated with a customer to the merchant,
        wherein the request comprises identifying information;
    correlating, by the authentication notification server, the identifying information to a token received from a token generation and information storage server,
        wherein the token corresponds to the funds transfer account;
    upon correlating the identifying information to the token, transmitting, by the authentication notification server, the token to the token generation and information storage server to thereby cause a request for utilization of the funds transfer account to be transmitted;
    receiving, by the authentication notification server, an approval relating to the request for utilization of the funds transfer account; and
    transferring, by the authentication notification server, the approval to the merchant,
    wherein the method does not disclose to, transfer to, or store funds transfer account information associated with the funds transfer account with the merchant or the authentication notification server,
        wherein the funds transfer account information further comprises one or more of: funds transfer account numbers, CVV numbers, and expiration dates.

2. A method according to claim 1, further comprising:
    receiving, by the authentication notification server, account information associated with the funds transfer account; and
    transferring, by the authentication notification server, to the token generation and information storage server, the account information.

3. A method according to claim 2, further comprising:
    receiving, by the token generation and information storage server, the account information;
    generating, by the token generation and information storage server, the token;
    storing, by the token generation and information storage server, the token and the account information; and
    transmitting, by the token generation and information storage server, to the authentication notification server, the token.

4. A method according to claim 3, further comprising:
    correlating, by the token generation and information storage server, the funds transfer account to a financial institution associated with the funds transfer account;
    transmitting, by the token generation and information storage server, to the financial institution, the account information; and
    receiving, by the token generation and information storage server, from the financial institution, a verification, wherein the token is generated by the token generation and information storage server upon receiving the verification.

5. A method according to claim 4, further comprising storing, by the token generation and information storage server, the token.

6. A method according to claim 5, further comprising removing, from the authentication notification server, the account information.

7. A method according to claim 6, wherein:
    the request for utilization of the funds transfer account is transmitted by the token generation and information storage server to an independent service organization ("ISO") associated with the funds transfer account; and
    wherein the approval relating to the request for utilization of the funds transfer account is received by the authentication notification server, from the ISO.

8. A method according to claim 1, further comprising:
    receiving, by the authentication notification server, from the customer, a passcode,
    wherein the transaction request is transmitted to the token generation and information storage server upon determining, by the authentication notification server, that the received passcode matches a stored passcode associated with the customer.

9. A method according to claim 1, wherein the funds transfer account is selected from the group consisting of: a credit card account, a bank account, a debit card account and a gift card account.

10. A method according to claim 9, wherein the funds transfer account is a credit card account.

11. A method according to claim 1, wherein the identifying information is a pin number.

12. A method according to claim 1, further comprising transferring, by the authentication notification server, the approval to the customer.

\* \* \* \* \*